(12) United States Patent
Gole et al.

(10) Patent No.: US 9,367,578 B2
(45) Date of Patent: Jun. 14, 2016

(54) METHOD AND SYSTEM FOR MESSAGE TRACKING AND CHECKING

(75) Inventors: Remy Edouard Gole, Grasse (FR); Benoit Ducol, Antibes (FR); Marc Traina, Tourette-Levens (FR)

(73) Assignee: Amadeus S.A.S., Biot (FR)

( * ) Notice: Subject to any disclaimer, the term of this patent is extended or adjusted under 35 U.S.C. 154(b) by 929 days.

(21) Appl. No.: 13/354,154

(22) Filed: Jan. 19, 2012

(65) Prior Publication Data

US 2013/0166729 A1 Jun. 27, 2013

(30) Foreign Application Priority Data

Dec. 22, 2011 (EP) ..................................... 11306756

(51) Int. Cl.
*G06F 15/173* (2006.01)
*G06F 17/30* (2006.01)
(Continued)

(52) U.S. Cl.
CPC .... *G06F 17/30368* (2013.01); *G06F 17/30578* (2013.01); *G06F 17/30194* (2013.01); *H04L 67/10* (2013.01); *H04L 67/288* (2013.01); *H04L 67/2842* (2013.01); *H04L 67/34* (2013.01); *H04L 69/16* (2013.01)

(58) Field of Classification Search
CPC ......... H04L 69/16; H04L 67/34; H04L 67/10; H04L 67/2842; H04L 67/2857; H04L 67/288; G06F 17/30194
USPC ......................................................... 709/224
See application file for complete search history.

(56) References Cited

U.S. PATENT DOCUMENTS 6,604,205 B1    8/2003    Huang
7,143,244 B2 *  11/2006  Ling et al. ..................... 711/141
(Continued)

FOREIGN PATENT DOCUMENTS

JP    2005033242 A    3/2005
JP    2010113523 A    5/2010

OTHER PUBLICATIONS

Donglai Dai; Panda, D.K., "Reducing cache invalidation overheads in wormhole routed DSMs using multidestination message passing," in Parallel Processing, 1996. vol. 3. Software., Proceedings of the 1996 International Conference on , vol. 1, No., pp. 138-145 vol. 1, Aug. 12-16, 1996.*

(Continued)

*Primary Examiner* — Taylor Elfervig
(74) *Attorney, Agent, or Firm* — Thompson Hine LLP

(57) ABSTRACT

An invalidation tracker system for tracking messages in a caching architecture of a pricing and shopping platform. The caching architecture includes multiple levels each comprising one or more servers. Invalidation messages are communicated from one level to another to send invalidation messages to all servers in the caching architecture. The system receives data from provider databases to be communicated to the servers in the caching architecture. The system includes a recording module for recording all invalidation messages communicated to the servers in the caching architecture to form a set of sent invalidation messages, an analyzing module for determining the invalidation messages received at each server in the caching architecture and comparing this with the set of sent invalidation messages to identify one or more undelivered invalidation messages, and a reply module for resending the one or more identified undelivered invalidation messages to an appropriate server in the caching architecture.

19 Claims, 18 Drawing Sheets

(51) Int. Cl.
    *H04L 29/06*     (2006.01)
    *H04L 29/08*     (2006.01)

(56) References Cited

U.S. PATENT DOCUMENTS

| | | | | |
|---|---|---|---|---|
| 7,653,668 | B1* | 1/2010 | Shelat et al. | 707/610 |
| 7,664,125 | B1* | 2/2010 | Bauer et al. | 370/408 |
| 2002/0144148 | A1* | 10/2002 | Hashem et al. | 713/201 |
| 2005/0055509 | A1* | 3/2005 | Ling | G06F 12/0808 |
| | | | | 711/133 |
| 2006/0212775 | A1* | 9/2006 | Cypher | 714/758 |

OTHER PUBLICATIONS

Weiping He; Ing-Ray Chen; Baoshan Gu, "A Proxy-Based Integrated Cache Consistency and Mobility Management Scheme for Mobile IP Systems," in Advanced Information Networking and Applications, 2007. AINA '07. 21st International Conference on, vol., No., pp. 354-361, May 21-23, 2007.*

SungHun Nam; IlYoung Chung; Chong-Sun Hwang, "An efficient cache invalidation scheme for mobile wireless environments," in Parallel and Distributed Systems, 2001. ICPADS 2001. Proceedings. Eighth International Conference on, vol., No., pp. 289-296, 2001.*

Chang-Kyu Lee; Jong Hyuk Choi; Kyu Ho Park; Bong Wan Kim, "Fast and cost effective cache invalidation in DSM," In Parallel and Distributed Systems, 2000. Proceedings. Seventh International Conference on, vol., No., pp. 492-497, 2000.*

IP Australia, Examination Report issued in Patent Application No. 2012330499 dated Jul. 22, 2014.

European Patent Office, Search Report issued in application No. EP 11 30 6756 dated Aug. 22, 2012.

International Bureau of WIPO, International Preliminary Report on Patentability issued in International application No. PCT/EP2012/070318 Dated Jun. 24, 2014.

European Patent Office, International Search Report issued in International application No. PCT/EP2012/070318 dated Sep. 5, 2012.

Wiesmann, et al., "Database replication techniques: a three parameter classification", Reliable Distributed Systems, Proceedings of the 19th IEEE Symposium on Nurnberg, Germany Oct. 16-18, 2000.

Garcia-Munoz et al., "Recovery Protocols for Replicated Databases—A Survey", IEEE 31st International Conference on Advanced Information Networking and Applications Workshops, May 21, 2007.

Japanese Patent Office, Office Action issued in corresponding Application No. 2014-547780 dated Jan. 29, 2016.

* cited by examiner

US 9,367,578 B2

METHOD AND SYSTEM FOR MESSAGE TRACKING AND CHECKING

PRIORITY CLAIM

This application claims the benefit of European Patent Application No. 11306756.5, filed Dec. 22, 2011; the disclosure of which is incorporated herein by reference in its entirety.

FIELD OF THE INVENTION

The present invention relates to a method and system for tracking and checking messages, and taking remedial action if necessary.

BACKGROUND OF THE INVENTION

In a travel system there are many messages distributed from one place to another. A travel system may typically contain a central data server and a caching architecture composed of a number of different levels of caches distributed throughout the system. The caching architecture acquires updates from a number of different providers which are then communicated from an application server to the different levels of caches. The system works on the basis that no confirmation of the message or messages is required. The system assumes that the message or messages have been well received. The database application server will send messages to a number of central caches on central data servers, which in turn will then send messages to a local cache on a large number of computation servers. These messages are intended to invalidate the content of the caches. They are called invalidation messages. In the typical travel system there may be as many as 100,000 updates each day this equates to a vast number of messages to be dealt with. A problem arises if messages are not received, at which time problems can arise which can cause financial impact on customers. In order to ensure and control data consistency in a distributed caching architecture, asynchronous invalidation messages may be used. The manner in which this is achieved is difficult and time-consuming and has not presently been achieved in an effective way.

A number of systems have been proposed for dealing with auditing airline passenger tickets. One such system has been proposed by Northwest airlines, which uses an expert system audit process to review reports. This system fails to deal with many of the issues associated with the problems of tracking invalidation messages and the like. Similarly, other systems provide fare verification products and mapping and matching products, which again fail to address the problems of tracking invalidation messages.

U.S. Pat. No. 6,604,205 discloses a method and system for state synchronization between at least two devices connected in the same network. The first device sends a message to the second device with a first identifier attached to the message. The second device then applies a specific process to the message which in turn transforms the first identifier into a second identifier. The first device then sends the state request to the second device to request transmission of the second identifier. The comparison module of the first device then compares the first identifier and the second identifier to determine if the state of the first device is synchronized with the state of the second.

OBJECTS OF THE INVENTION

It is an object of the present invention to overcome at least some of the problems associated with the prior art.

It is a further object of the present invention to provide a method and system which can effectively track and monitor invalidation messages and resend the messages where necessary.

SUMMARY OF THE INVENTION

The present invention provides a method and system as set out in the accompanying claims.

According to one aspect of the present invention there is provided an invalidation tracker system for tracking messages in a caching architecture of a pricing and shopping platform, wherein the caching architecture includes a number of levels, in which each level comprises one or more servers, in which invalidation messages are communicated from one level to another in order to send invalidation messages to all servers in the caching architecture, and wherein the invalidation tracker system receives data from provider databases to be communicated to the servers in the caching architecture; wherein the invalidation tracker system includes:
  a recording module for recording all invalidation messages communicated to the servers in the caching architecture to form a set of sent invalidation messages;
  an analysing module for determining the invalidation messages received at each server in the caching architecture and comparing this with the set of sent invalidation messages to identify one or more undelivered invalidation messages; and
  a replay module for resending the one or more identified undelivered invalidation messages to an appropriate server in the caching architecture.

Optionally, the replay module resends invalidation messages based on a predetermined condition having been met.

Optionally, the predetermined condition comprises a plurality of recurring undelivered invalidation messages.

Optionally, the predetermined condition is triggered when the number of undelivered invalidation matched messages exceeds a predetermined threshold.

Optionally, the predetermined condition is identification of the server being non-operational.

Optionally, the system further comprises a notification module for creating and communicating notifications of undelivered invalidation messages to a user.

Optionally, the system further comprises a reporting module for creating reports and communicating said reports to a user.

Optionally, the invalidation tracker further comprises a supervisor module for controlling automatic retrieval of undelivered invalidation messages.

Optionally, the invalidation tracker system further comprises a configuration management module which stores information relating to the settings and topography of the caching architecture.

According to a second aspect of the invention, there is provided a method for tracking messages in a caching architecture of a pricing and shopping platform, wherein the caching architecture includes a number of levels, in which each level comprises one or more servers, in which invalidation messages are communicated from one level to another in order to send invalidation messages to all servers in the caching architecture, and wherein the messages are tracked by an invalidation tracker system which receives data from provider databases to be communicated to the servers in the caching architecture; wherein the method includes:
  recording via a computer all invalidation messages communicated to the servers in the caching architecture to form a set of sent invalidation messages;

determining via a detector in a computer the invalidation messages received at each server in the caching architecture and comparing this with the set of sent invalidation messages to identify one or more undelivered invalidation messages; and resending via a messaging system the one or more identified undelivered invalidation messages to an appropriate server in the caching architecture.

Optionally, the step of resending the invalidation message is based on a predetermined condition.

Optionally, the predetermined condition comprises identifying a plurality of recurring undelivered invalidation messages.

Optionally, the predetermined condition comprises triggering the replay of messages when the number of undelivered invalidation matched messages exceeds a predetermined threshold.

Optionally, the predetermined condition comprises identifying the server is non-operational.

Optionally, the method includes a step of creating and communicating notifications of undelivered invalidation messages to a user.

Optionally, the method includes a step of creating reports and communicating said reports to a user.

Optionally, the method includes a step of controlling automatic retrieval of undelivered invalidation messages via a supervisor module.

Optionally, the method includes a step of storing information relating to the settings and topography of the caching architecture via a configuration management module.

BRIEF DESCRIPTION OF THE DRAWINGS

Reference will now be made, by way of example, to the accompanying drawings, in which.

DETAILED DESCRIPTION OF THE PREFERRED EMBODIMENTS

Figure 2:
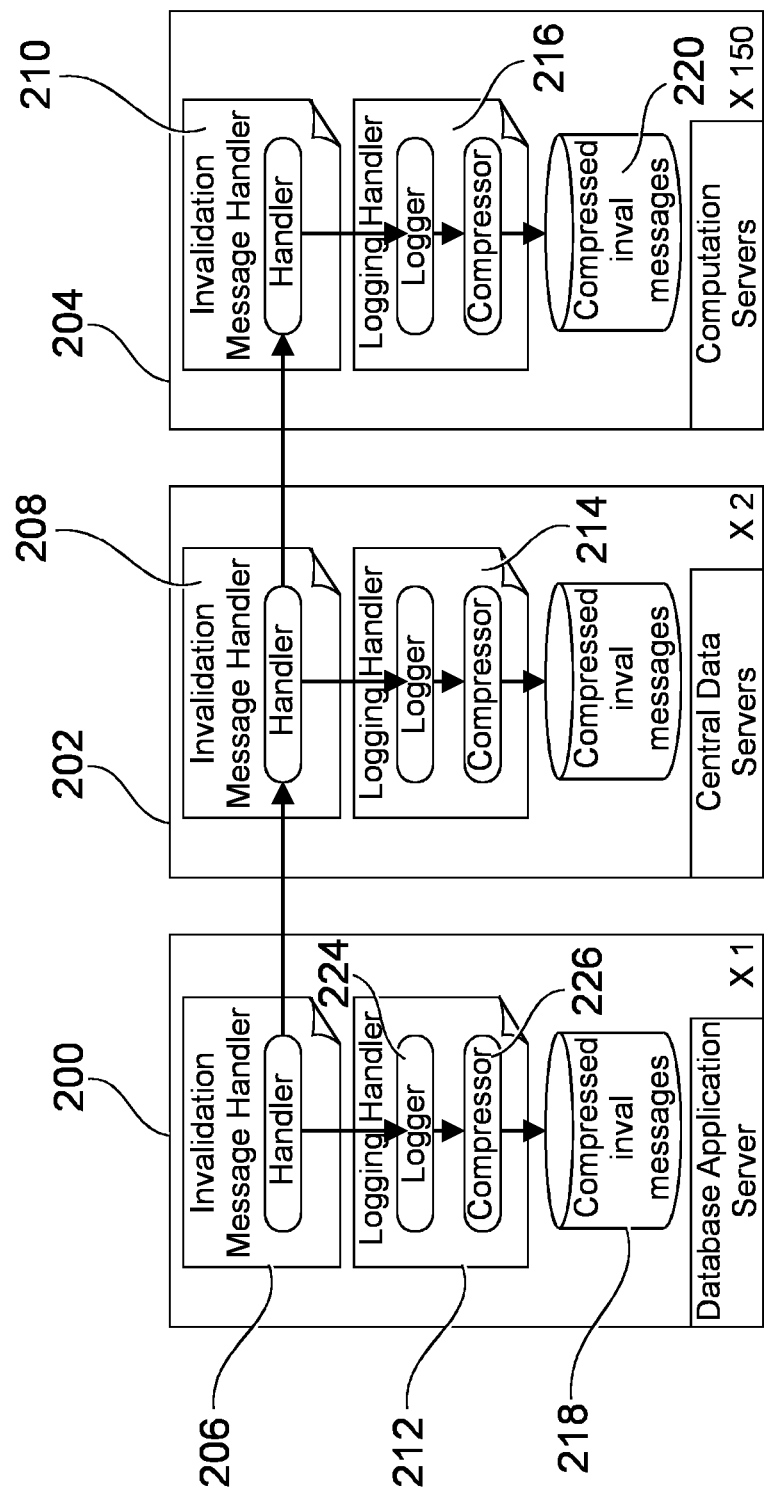
FIG. 2 is a block diagram of the system for a first part of the process, in accordance with an embodiment of the invention.

The present invention relates to an invalidation tracker system designed to be used in the context of a fare caching system. The pricing and shopping platform (PSP) caching architecture is made up of several levels of cache distributed across the PSP components. As shown in FIG. 2, there is a single database application server 200 which communicates with a plurality of central data servers 202, which in turn communicate with a multitude of computational servers 204. In the examples shown, there are three central data servers and about 150 computation servers. It will be appreciated that a different number of central data servers and computational servers may be used in different environments. This caching architecture is connected to databases which continually acquire data updates from providers. Caches are updated by means of invalidation messages sent from the database application server. There may be more than one database, such as a master file database and an active image database. However, different databases may be used in different circumstances.

The invalidation tracker system and method involves checking that the invalidation messages sent by a data application server are received by end-users. The checks are made on a periodic basis and if any discrepancies are identified, invalidation messages may be automatically resent, or resent under user control. If a persistent problem is identified, an alarm or error message can be produced so that users or operators can be informed. The invalidation tracker system and method can be used to perform investigations on all system components and subsystems in the invalidation flow.

Figure 1:
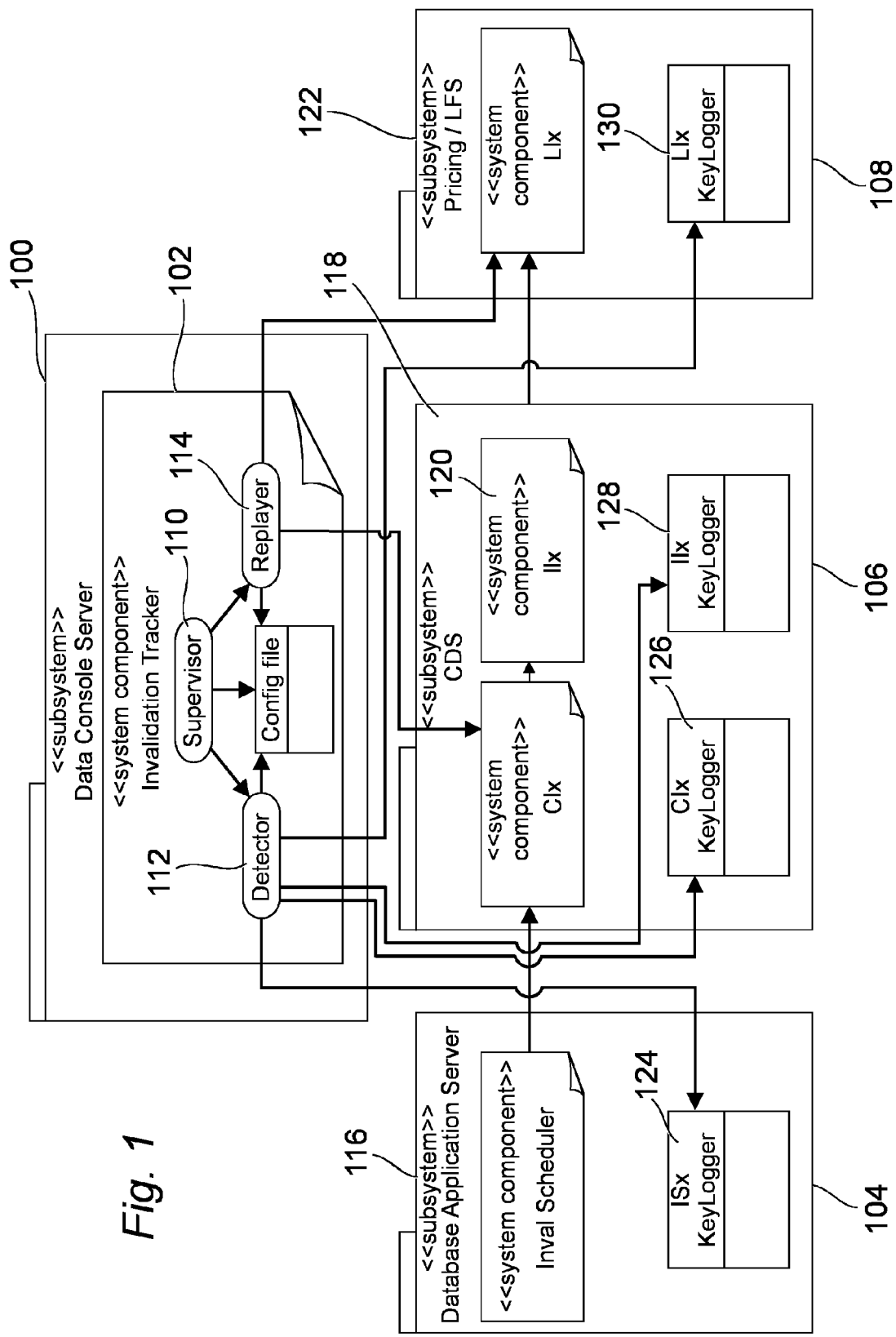
FIG. 1 is a block diagram of the invalidation tracker system, in accordance with an embodiment of the invention.

Referring to FIG. 1, an overview of the invalidation tracker system components is shown. The various features are described in more detail in FIG. 3. The system includes a data console server 100 at which the invalidation tracker 102 is located. The system further includes a database application server 104, a client data server (CDS) subsystem 106, and a pricing or a low fare search (LFS) subsystem 108 (later referred to as computational servers). The invalidation tracker system includes three main modules. An invalidation tracker supervisor 110 manages the full automatic detection and replay or resend any lost invalidation messages for a given time range and a given set of end-users or targets. An invalidation tracker detector module 112 identifies missing invalidation messages by analyzing keys from a key logger file of target invalidation components. An invalidation tracker replay module 114 replays or resends lost invalidation messages to the requested targets. The invalidation tracker system is based at the middleware services level.

A logical invalidation flow includes four types of system components. The first is a database application server invalidation service located on a database application server 116. This sends arrays of logical keys to the message queue of CDS CIX (Central invalidation) server queues. The CIX servers 118 receive messages containing arrays of logical entity keys to invalidate and dispatch them into messages containing single keys to the IIX (Individual invalidation) servers 120. The IIX servers manage single invalidation messages on a CDS cache and forward the invalidation messages to the LIX (Local invalidation) server 122 on the pricing satellites or targets 124. The LIX servers process the invalidation messages on computational servers. Each server includes an appropriate key logger (124, 126, 128 and 130) which is in communication with detector 112. The aim of the key logger is to locally store all the messages received by each server.

The invalidation tracking system requires that each invalidation system component logs the keys of any message it receives. This logging is done through the key logger system components associated with each server. The key is logged, which makes it easier to determine where the invalidation flow failed. Communication between the invalidation tracker system components is based on standard middleware communications. As a result, all necessary information relating to a particular component in the system is stored in an invalidation tracker dedicated configuration file. The necessary information may include hostname, targeted middleware environment or targeted database. The invalidation tracker system can determine whether targets are operable in terms of invalidation, and if not the target may be ignored.

The invalidation tracker system monitors and replays invalidation messages by means of several bespoke processes. The first process is the recording process, in which invalidation messages received by the server are recorded on each server. In an analyzing process invalidation messages received on each server are checked from end to end in a regular time based manner. A replay process is used if a message is lost, and automatically replays the relevant message to refresh the corresponding data. A notification process is used to identify if a message is lost. A reporting process is used to log and archive all actions and generate statistics reports from time to time. Each of the bespoke processes will be described with reference to FIGS. 2 to 6.

Returning to FIG. 2, each server includes an invalidation message handler respectively 206, 208 and 210; a logging handler respectively 212, 214 and 216; and a database of compressed invalidation messages respectively 218, 220 and 222. Messages are sent from the invalidation message handler 206 to the invalidation message handlers 208. The invalidation message handlers 208 then propagate the messages to respective invalidation message handlers 210.

Each invalidation message handler passes messages to its respective logging handler where it is logged and compressed in modules 224 and 226 as shown in the data application server. After the message has been logged and compressed, the compressed messages are stored in database 218 as shown in the data application server. Similar arrangements are found in the central data servers and computational servers. This completes the recording process of all invalidation messages on each server.

For a typical PSP caching system of this type the total volume of data will be in the order of 4.5 GB each day with a local rate of about 15,000 messages per second. Retention delay of the caching system will be typically of the order of five days. All messages that are sent are stored for a predetermined time in the compressed invalidation messages database of each server.

Figure 3:
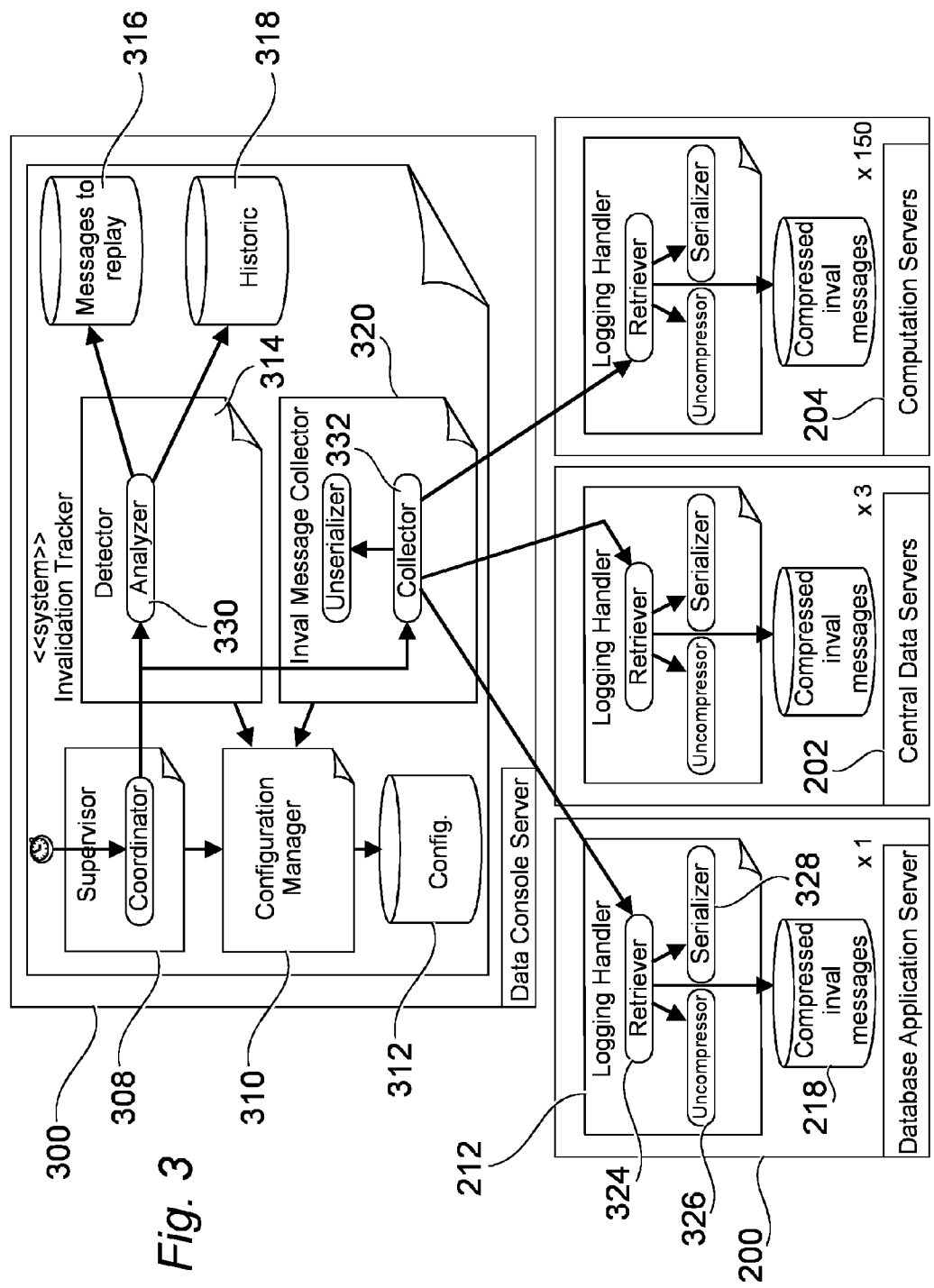
FIG. 3 is a block diagram of the system for a second part of the process, in accordance with an embodiment of the invention.
Figure 4:
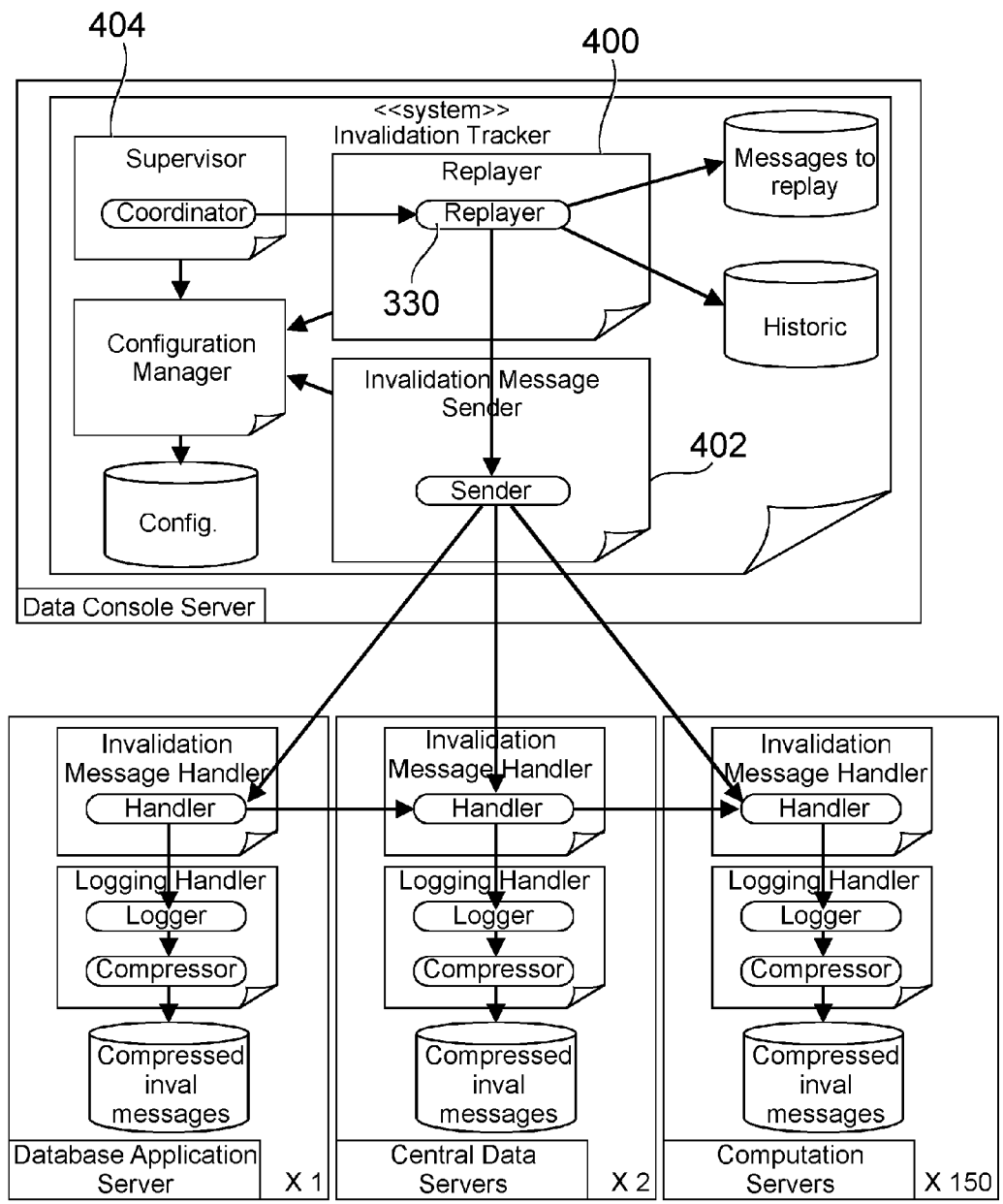
FIG. 4 is a block diagram of the system for a third part of the process, in accordance with an embodiment of the invention.

Referring now to FIG. 3, the analysis process will now be described. A data console server 300 is in communication with the data application server 200, the central data servers 202 and the computational servers 204. The invalidation tracker system in the data console server comprises a coordinator module 308, a configuration manager 310, and a configuration database 312. In addition, the invalidation tracker further includes a detector 314 in communication with two databases: a database of messages to replay 316 and a historic database 318. The detector is also in communication with an invalidation message collector 320.

Each of the servers 200, 202 and 204 include a logging handler shown as 212 in the data application server 200. The logging handler is in communication with the database of compressed invalidation messages 218. The logging handler includes a retrieval module 324, an un-compressor module 326 and a serialization module 328. The other sensors 202 and 204 are equivalently configured.

The coordinator module periodically triggers a cycle of analysis. The coordinator module is in communication with the analyzer module 330 in the detector 314. The analyzer is similarly in communication with a collector module 332 in the invalidation message collector 320. The collector module collects and records details of the received or completed invalidation messages from the PSP system servers. Collections are made from each of the layers of server: the database application server; the central database servers; and the computation servers. The analyzer module then applies an algorithm to detect, identify and store messages that have not been received or have been lost. As previously mentioned, the key log for each message makes it easy to identify the message and where it was lost. The messages that have been lost and may need to be later replayed are stored in the database 316. The configuration manager 310 has a centralized view of the setting and topography of the PSP system servers and can coordinate the collection of the invalidation messages. The configuration of the network is stored in the configuration database 312 and can be updated if the network changes. The historic database 318 is used to keep a record of all actions. In operation, the analyzer module 330 checks the messages received at the data base application server in a first instance. Subsequently the messages at the central data servers are checked and finally those at the computation servers are checked. This sequence enables identification of the point of failure for a particular invalidation message.

The retriever module 324 is in the database application server as indicated in FIG. 3. The retriever module 324 identifies and then transfers received invalidation messages. The messages are sent from the data application server to the central data servers and then from the central data servers to the computation servers.

Having analyzed the reception of invalidation messages, the next phase of the process is to replay or resend messages in the case where lost messages have been identified. This will be described with reference to FIG. 4 where like elements from FIG. 3 will have the same reference numbers and will not be described in further detail unless this pertains to the process of replaying invalidation messages. In addition to the previously described modules, the invalidation tracker includes a replay module 400 and an invalidation message sending module 402. After analysis of the lost invalidation messages determination is made of the number of messages that have been lost for a particular server. If the number of lost messages is below a certain threshold the sender or user is notified, and messages lost are resent. However, if the number of lost messages is above a certain threshold an alert status is sent to a coordinator or user, as it is likely that the server in question is no longer operational and resending messages will serve no purpose.

All actions and messages recorded and replayed are stored in the historic database. Having identified that a message has been lost at a certain server, the invalidation message sending module will send the lost message to the server that did not receive the message. If this server was the data application server or one of the central data servers, the message will then be passed respectively to the central data servers and the computation servers. If a message was lost at a particular server any servers after that point will also not have received the message, hence the reason for passing the message on when it is replayed for any server other than the computation servers, which are the end points of the invalidation flow. The messages sent within the PSP system servers follow the standard invalidation flow from the server which receives the replayed message.

Figure 5:
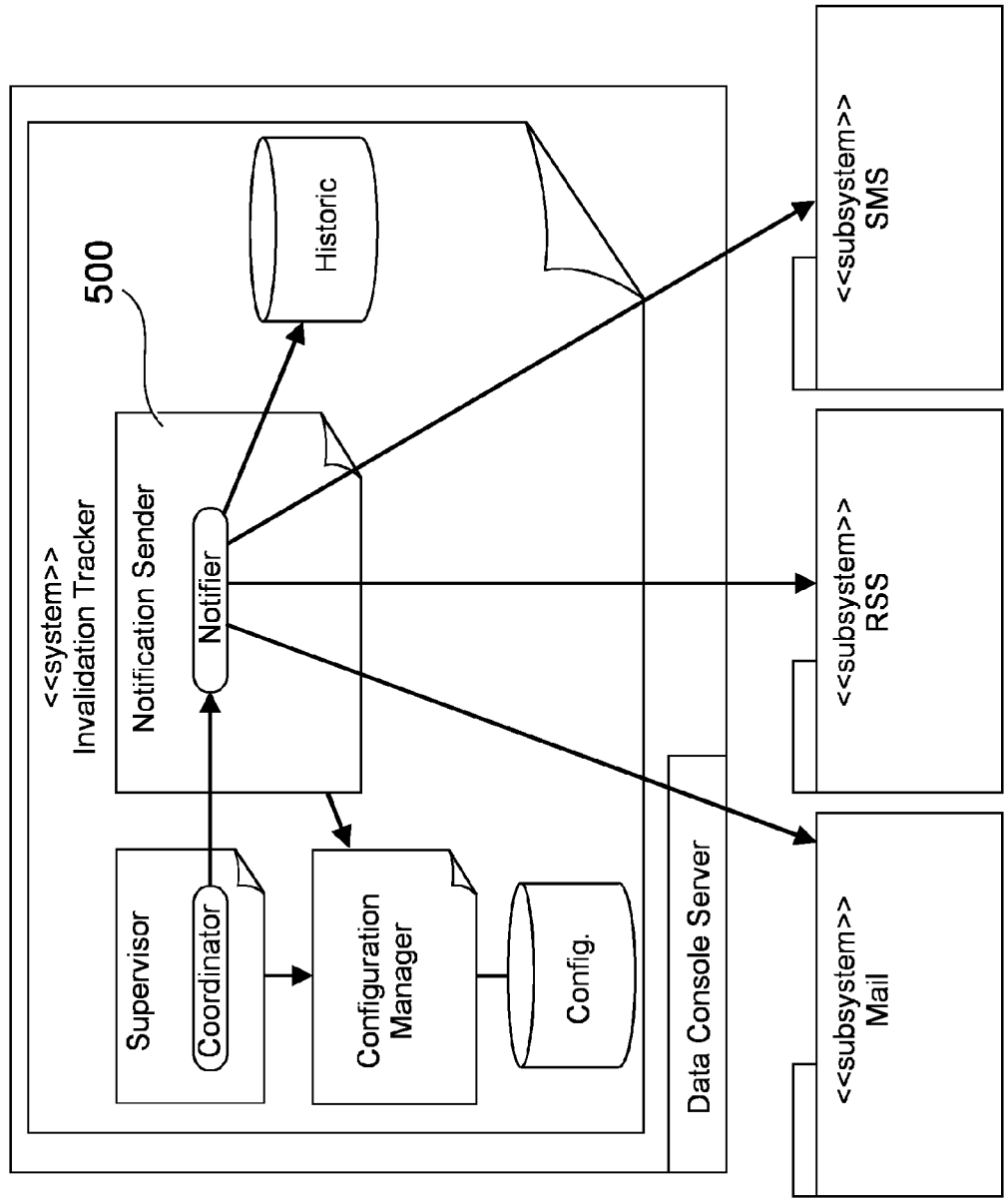
FIG. 5 is a block diagram of the system for a fourth part of the process, in accordance with an embodiment of the invention.

Referring to FIG. 5, the invalidation tracker system includes a notification module 500 which can be used to send notifications based on the status of messages which have been replayed. The messages can include the fact that all lost messages have been replayed. Alternatively a message can be sent indicating that messages have been replayed several times. If the numbers of messages that are lost are above a certain threshold, a notification may be generated, which gives an indication that a particular server is currently not operational. The notifications can be sent by means of any appropriate communication plug-in, such as mail, RSS (a web feed format), SMS, etc.

Figure 6:
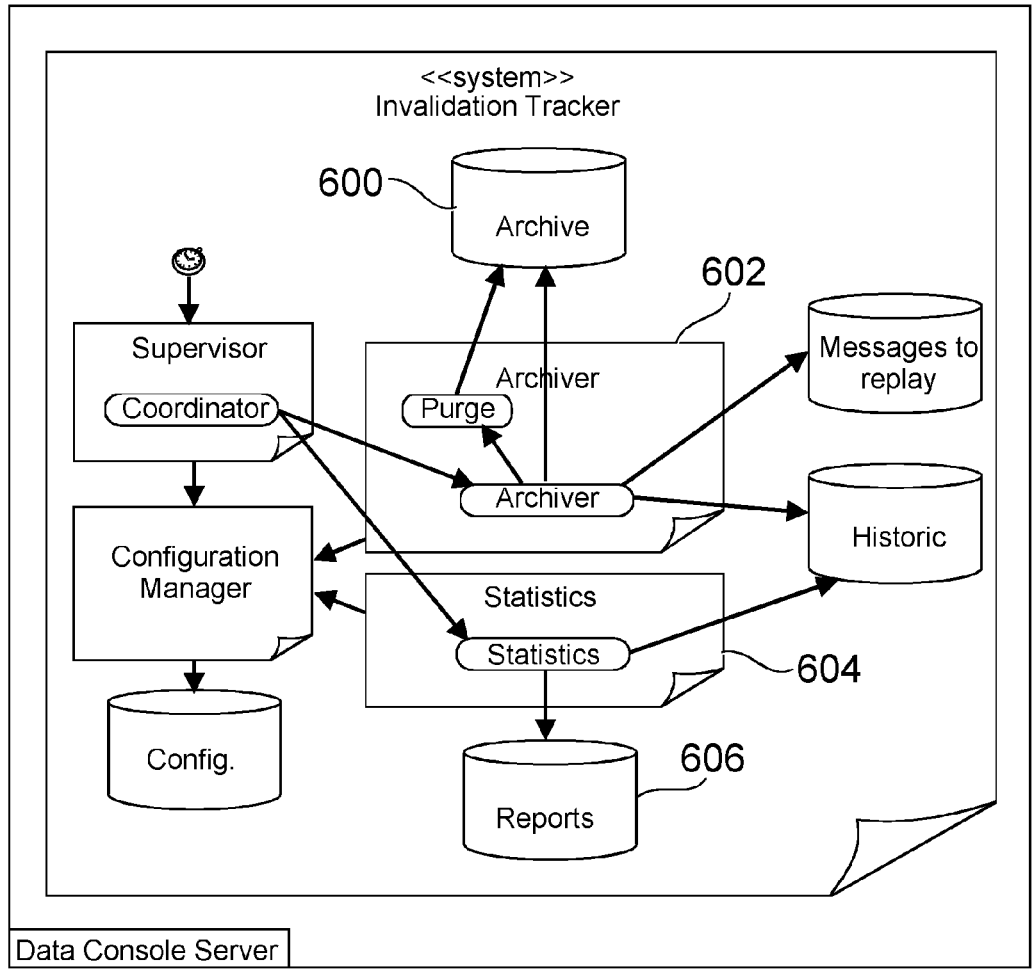
FIG. 6 is a block diagram of the system for a fifth part of the process, in accordance with an embodiment of the invention.

In a similar manner, FIG. 6 describes the reporting process of the present invention. The invalidation tracker system includes an archive database 600, an archive module 602, a statistics module 604 and a reports database 606.

The coordinator module can periodically trigger the generation of reports. In addition, the nature of the reports may be predefined or developed and generated on request from a particular user or provider. The nature of the reports may be identified by the configuration management module. The archive database includes more long-term retention of data than the historic database and the archive module can access the archive database and, using appropriate statistics, generate the required reports.

Figure 7:
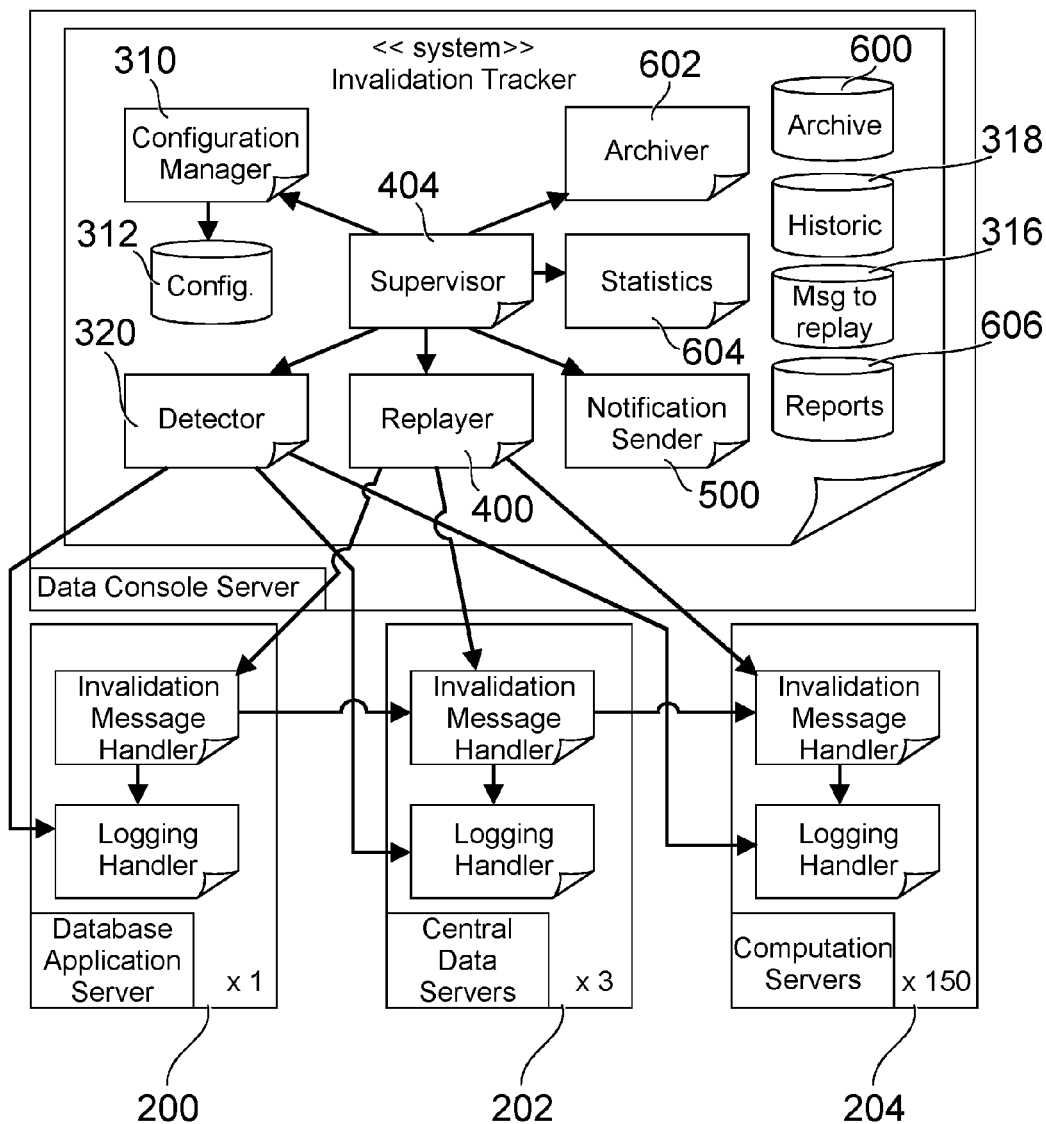
FIG. 7 is a block diagram of a global overview of the system, in accordance with an embodiment of the invention.

Each of FIGS. 2 to 6 have been used to describe part of the process carried out by the invalidation tracker system. FIG. 7 shows an overall global view of the invalidation tracker system. The various elements are numbered if in accordance with like elements in FIGS. 2 to 6 and the equivalent explanation and description will apply to each element. The invalidation tracker system as described above is fully automated and highly configurable. In addition, the invalidation tracker system is distributed, scalable and capable of being integrated with any global PSP system.

Figure 8:
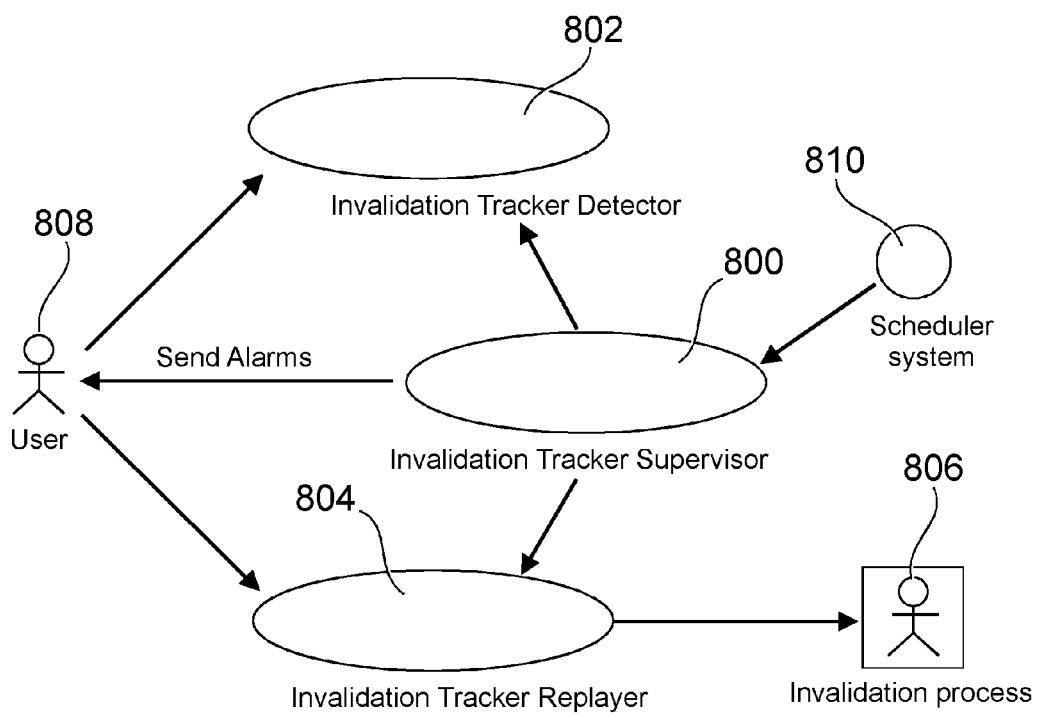
FIG. 8 is a use case general diagram of the system, in accordance with an embodiment of the invention.

The present invention is used to manage the huge volume of invalidation messages used in the travel industry. A high number of hosts can be monitored and a permanent dataflow can be tracked. Reference will now be made to a number of use case examples to further demonstrate the functionality of the present invention. FIG. 8 shows a general use case diagram. An invalidation tracker supervisor 800 is a high-level module which manages full automatic detection and replay of lost invalidation messages for a given time range and a given set of servers. The invalidation tracker detector module 802 determines lost invalidation messages by analyzing keys from the key logger files to target invalidation components. The invalidation tracker replay module 804 replays lost invalidation messages to the requested targets by means of the invalidation process 806. A user 808 is in communication with the various modules and the scheduling of the processes is managed by the scheduler system 810.

In the following specific use case, a user or invalidation tracker supervisor 900 is in communication with a number of targets to which invalidation messages are being sent, received or otherwise handled. The terms user and targets, in the following section, are to be interpreted in this manner.

Figure 9:
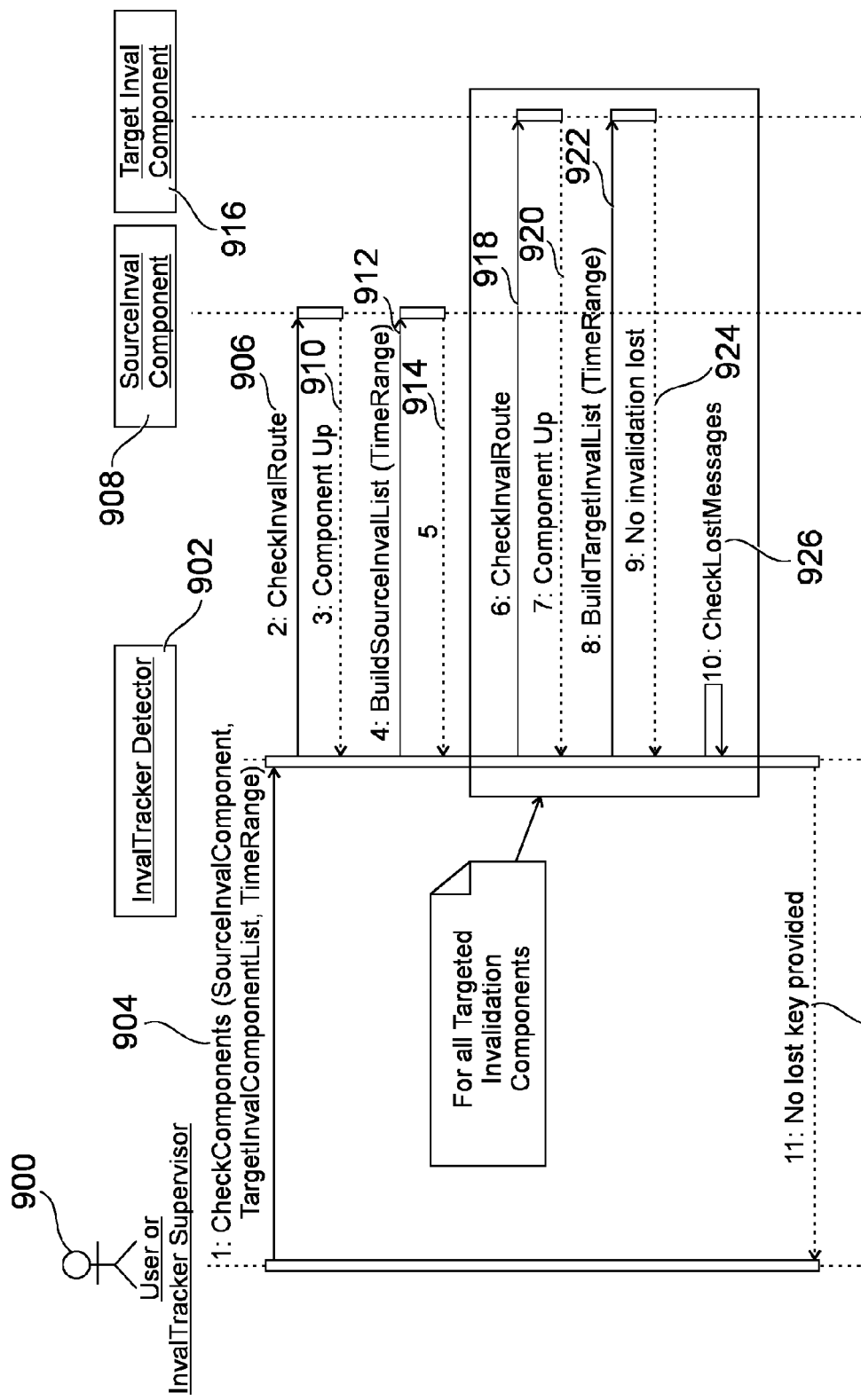
FIGS. 9 to 18 are a number of specific use case diagrams, in accordance with an embodiment of the invention.

FIG. 9 shows the use case in which all the targets are operational and no validation messages are lost. The invalidation tracker detector 902 receives the sent and received invalidation messages between the various system components and checks if any messages have been lost. If a message has been lost a list of lost keys is provided. The time range of the analysis is predefined and the user uses the invalidation tracker detector for specific investigations. Alternatively, automatic checks may be programmed to be carried out automatically.

In a first step 904 a request for a check is sent from the user to the invalidation tracker detector. This request can be based on a number of different criteria. In step 906 the invalidation tracker detector checks the invalidation route with the source invalidation component 908. The source invalidation component indicates that the component is operational in step 910. In step 912 the invalidation tracker detector requests the source invalidation component to build a source invalidation list for a specific time range; this is returned in step 914.

Subsequently the invalidation tracker detector carries out an investigation of all target invalidation components. For each targeted invalidation component the following steps are carried out. The invalidation tracker detector determines from the tracker invalidation component 916 if the invalidation route is operational in step 918. A reply is sent from the target invalidation component to confirm that the component is operational in step 920. The invalidation tracker detector requests a target invalidation list over a specific time range from the target invalidation component in step 922. In this case target invalidation component 916 confirms that no invalidation messages have been lost in step 924. After all the targeted invalidation components have been checked in this manner the invalidation tracker detector determines whether there are any messages that have been lost in step 926. In this case, as no messages have been lost the invalidation tracker detector communicates that there are no lost keys to the user in step 928. The list of target invalidation messages is built based on the logical keys logged by the requested invalidation system component in the given time range. The list itself comprises logical keys logged by the requested invalidation system for the given time. Step 926 comprises a comparison step in which the lists of keys logged by the servers and the destination invalidation system components are compared.

Figure 10:
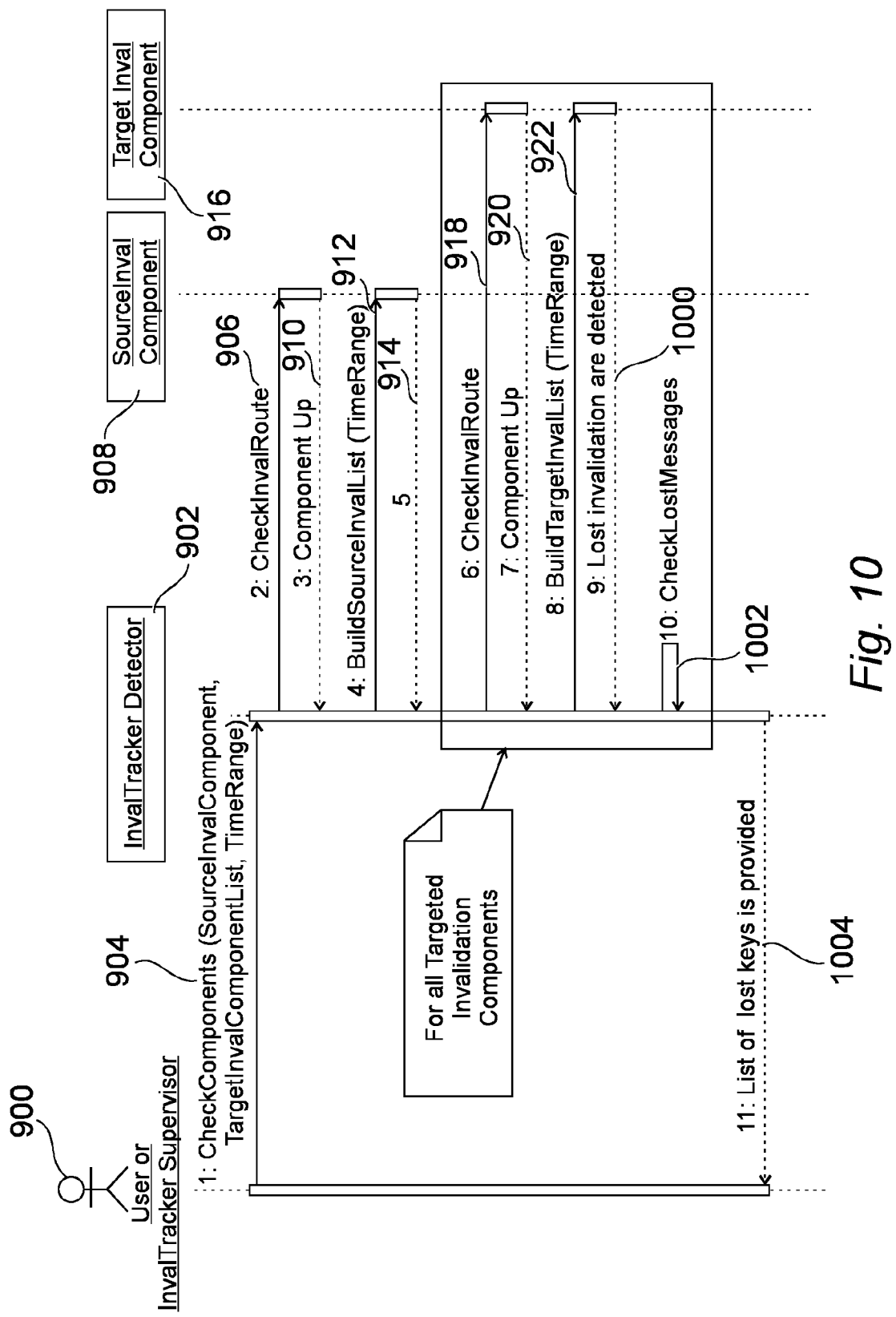

Referring now to FIG. 10, this use case relates to the targets being operational but invalidation messages being lost. Steps 904, 906, 910, 912, 914, 918, 920 and 922 are carried out as described in FIG. 9. However, in this case messages have been lost from one or more of the target invalidation components. As a result, in step 1000 an indication is produced that lost invalidation messages have been detected. At step 1002 the check of lost messages identifies the lost keys for each server and then communicates this to the user in step 1004.

Figure 11:
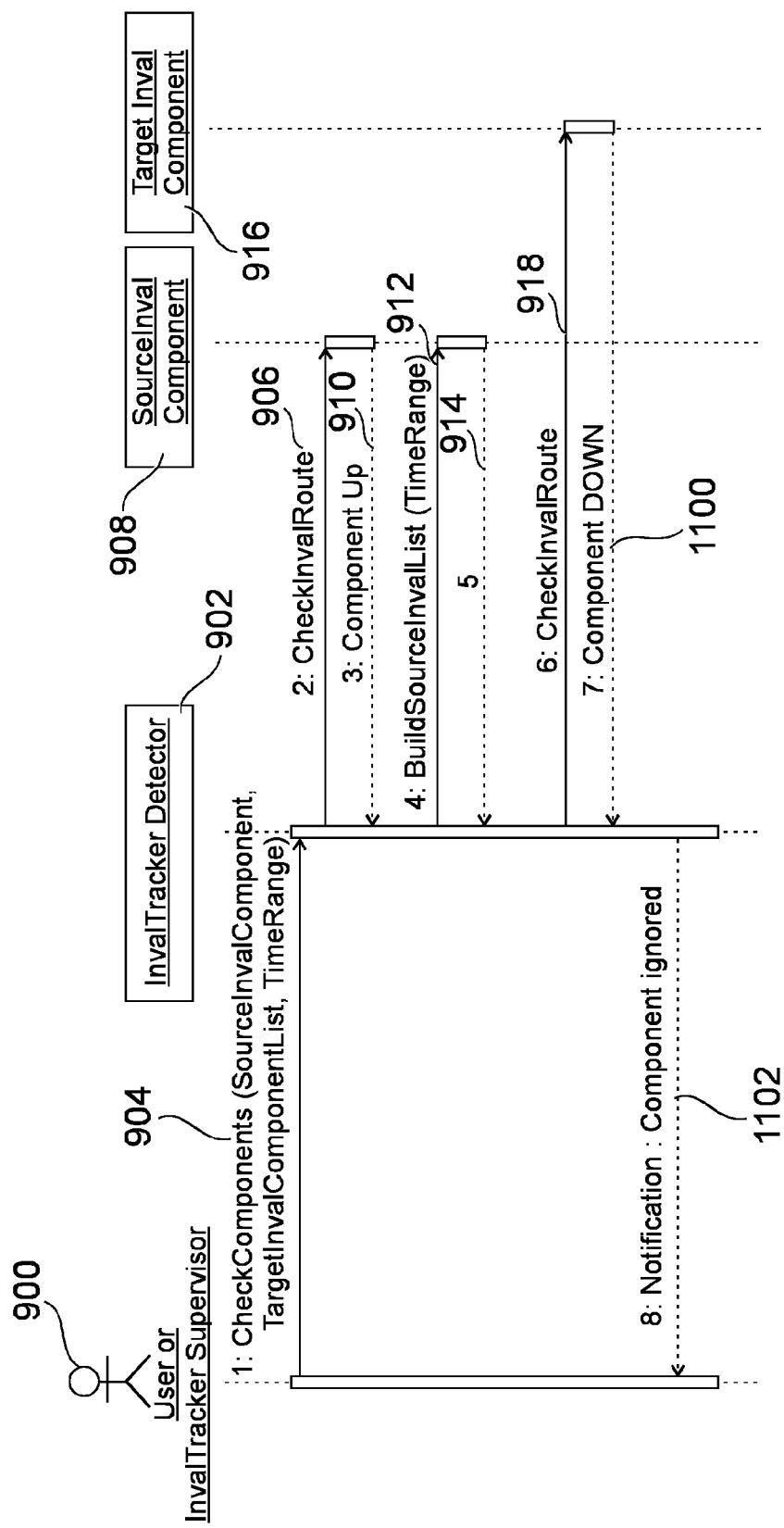

Referring now to FIG. 11, the use case relates to a target being non-operational. As in the previous examples, steps 904, 906, 910, 912, 914 and 918 are carried out as described above. As the target invalidation component is non-operational the invalidation tracker detector determines that the target is down in step 1100. In step 1102 the user is notified that the specific target invalidation component is non-operational and is not receiving messages.

Figure 12:
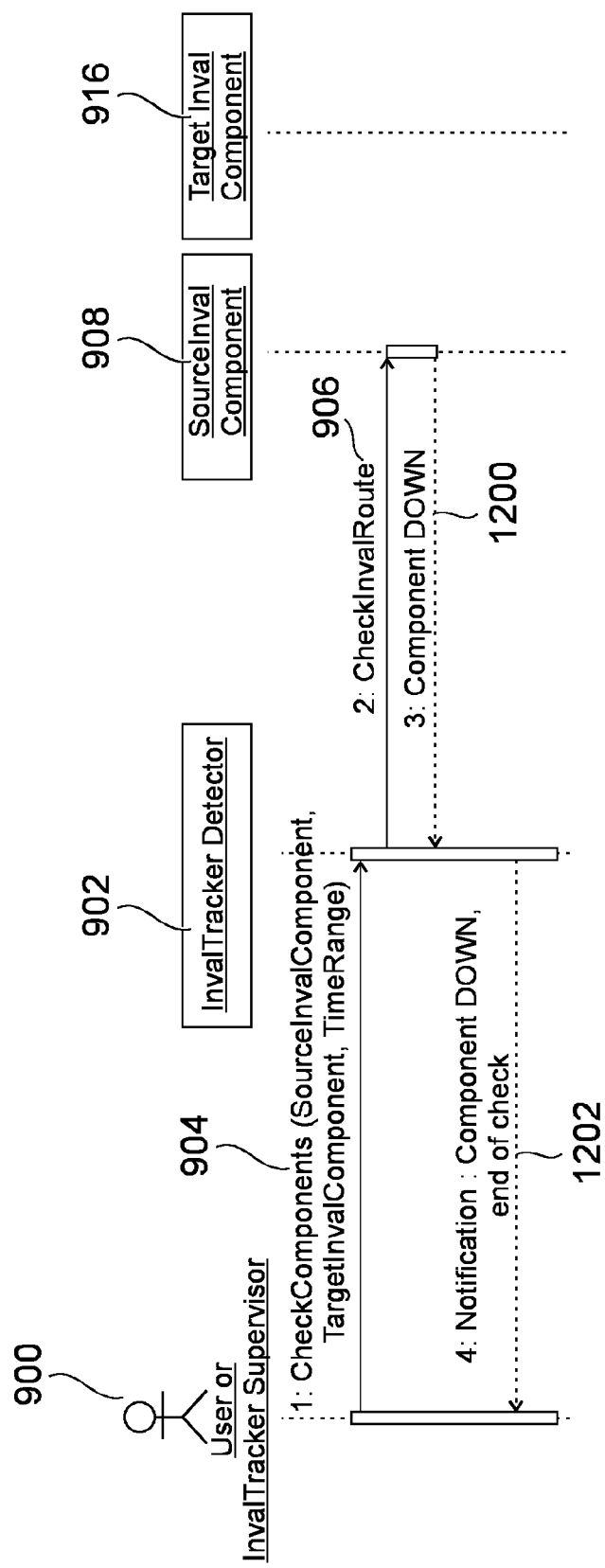

FIG. 12 relates to the use case where a source invalidation component is non-operational. Steps 904 and 906 are carried out as described above. As the source invalidation component is non-operational at step 1200 the invalidation tracker detector is notified that the component is non-operational. This is then communicated to the user in step 1202.

Figure 13:
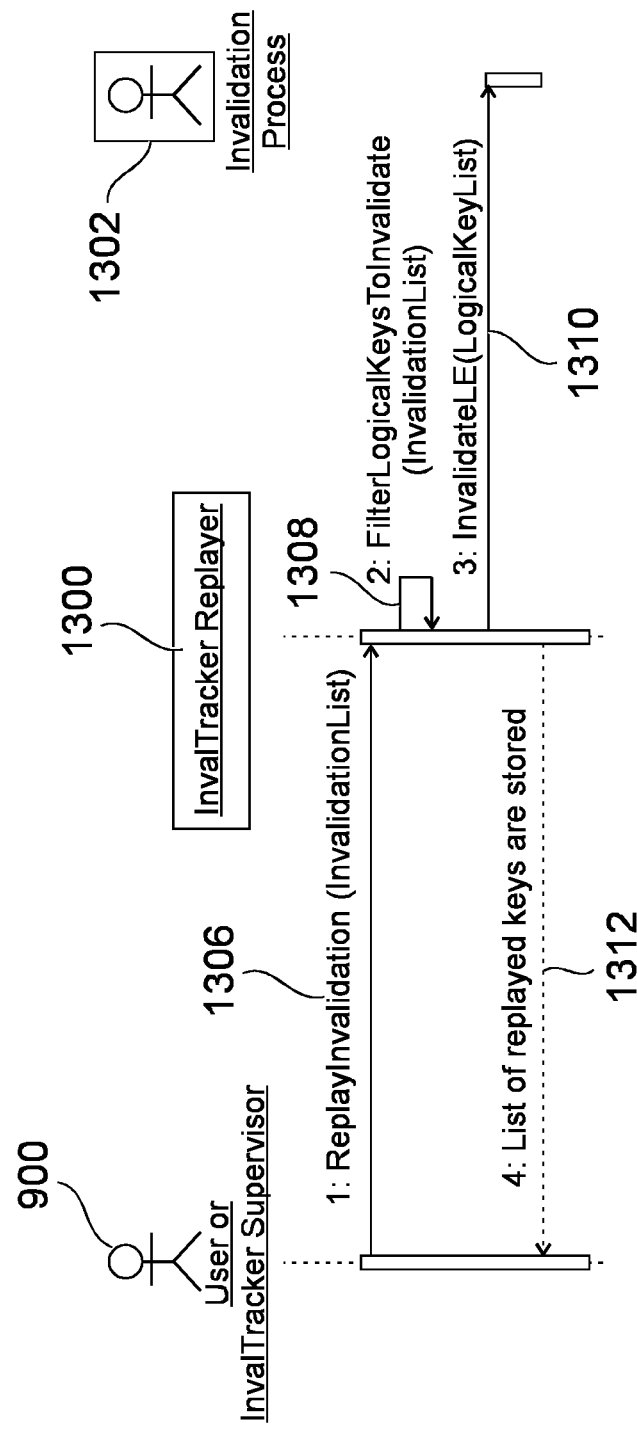

FIG. 13 relates to the use case where a number of invalidation messages are lost, but the number has not reached the predetermined threshold discussed above. In addition, the use case relates to the situation where there is no recurring lost invalidation message from a particular target. In this case the user or invalidation tracker supervisor 900 communicates with the invalidation tracker replay module 1300 and the invalidation process 1302. The user sends a list of invalidation messages to replay, in step 1306, to the invalidation tracker replay module 1300. The threshold (which relates to the maximum number of invalidation messages that can be replayed to a particular target) and the delay over which the threshold is measured are determined by the user. The list of messages that have already been replayed to each target is up-to-date, which means that the only missing messages being dealt with at the current time are those in the list provided in step 1306. The invalidation tracker replay module can be controlled by a user or a supervisor during a supervisory process. The list of messages to replay must contain only non-recurring lost messages and messages that did not reach a specific target, but have not reached the threshold. Any non-recurring lost messages are replayed with the delay configured by the user, based on the timing of the invalidation message being sent. A typical delay is of the order of one second. To protect the amount of information being replayed the system does not play invalidation messages if the number of messages has reached a threshold for each target, or the message has already been replayed during the given time range. In the situation where a threshold has been reached an alarm is raised and sent to the user by any appropriate means, such as e-mail.

Returning to FIG. 13, step 1308 relates to a step for filtering logical keys. The filter determines from the given message list and for a given target the logical keys to invalidate. No keys are filtered out because the threshold by target has not reached threshold and there are no recurring lost invalidation messages. As a result, all keys in the list are marked as ready to replay. In step 1310 the list of the logical keys for invalidation messages that have been lost are sent to the invalidation process. At the same time a list of replayed keys are stored and communicated to the user in step 1312.

Figure 14:
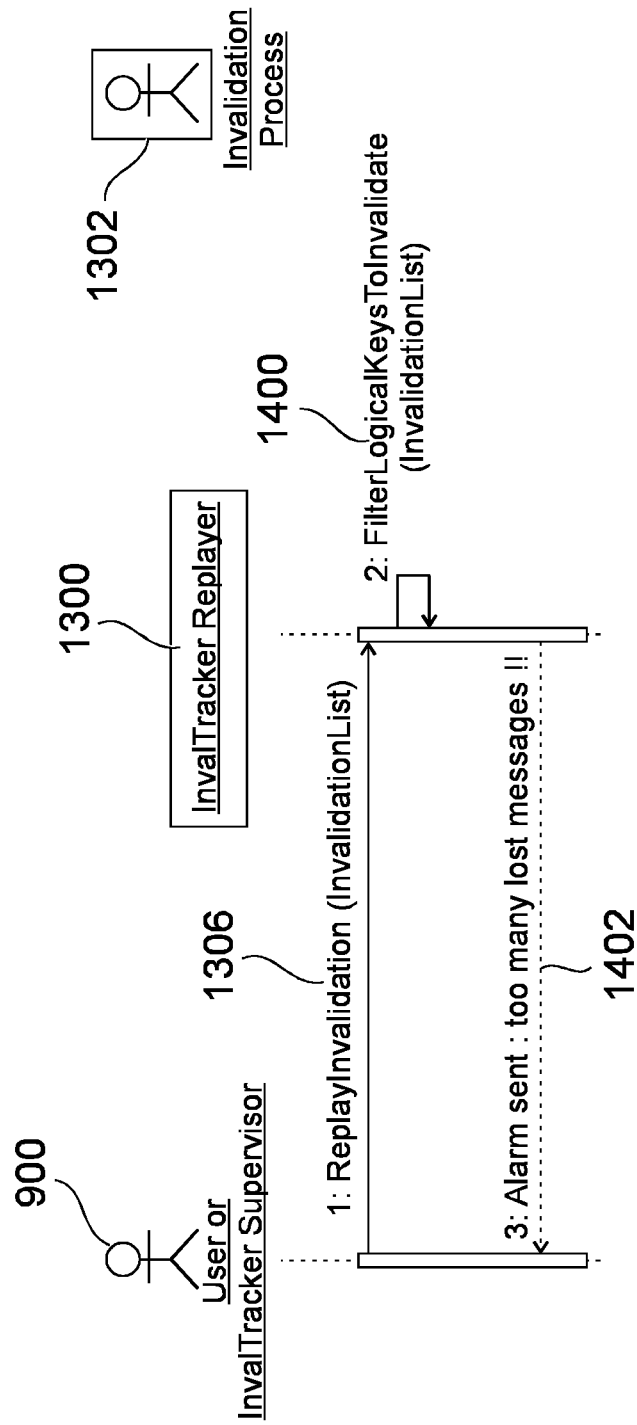

In FIG. 14 the use case relates to a number of invalidation messages that have been lost reaching or surpassing the threshold for at least one target. Step 1306 is carried out as previously described. The filter is applied at step 1400. In this case the logical keys for the invalidation messages are all filtered out by the filter as the number of lost invalidation messages has reached or surpassed the threshold for at least one target. As a result, the system will not play any invalidation messages. Instead a message is sent to the user in step 1402 to indicate that too many messages have been lost to replay them.

Figure 15:
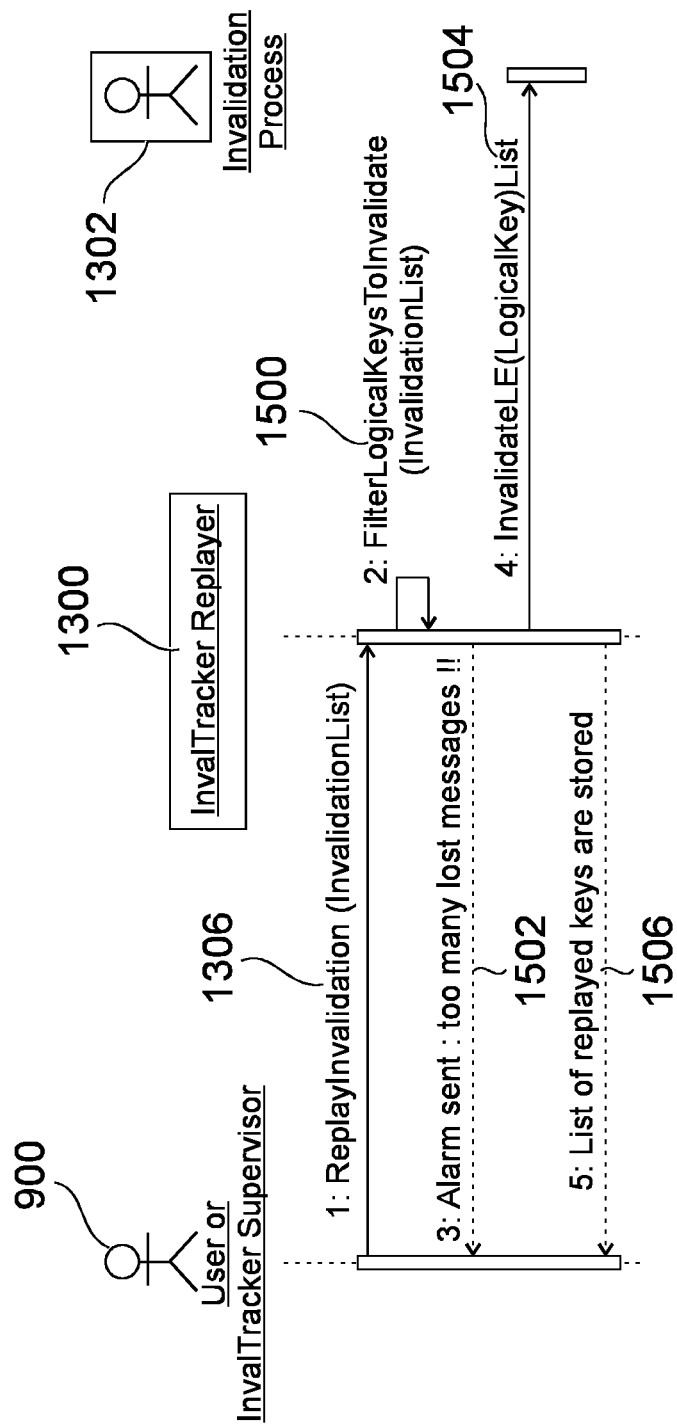

FIG. 15 relates to the use case in which there are recurring lost invalidation messages for a particular target. Steps 1306 is carried out as previously described. At step 1500 a filter is applied to the invalidation message list. In the list in this case there are some recurring errors. These are filtered out at step 1500 and generate an alarm of lost recurring messages at step 1502. Other messages on the list are sent to the invalidation process in step 1504 and replayed to the target in question. The user is notified in step 1506 of the messages that have been replayed, so that these can be stored.

Figure 16:
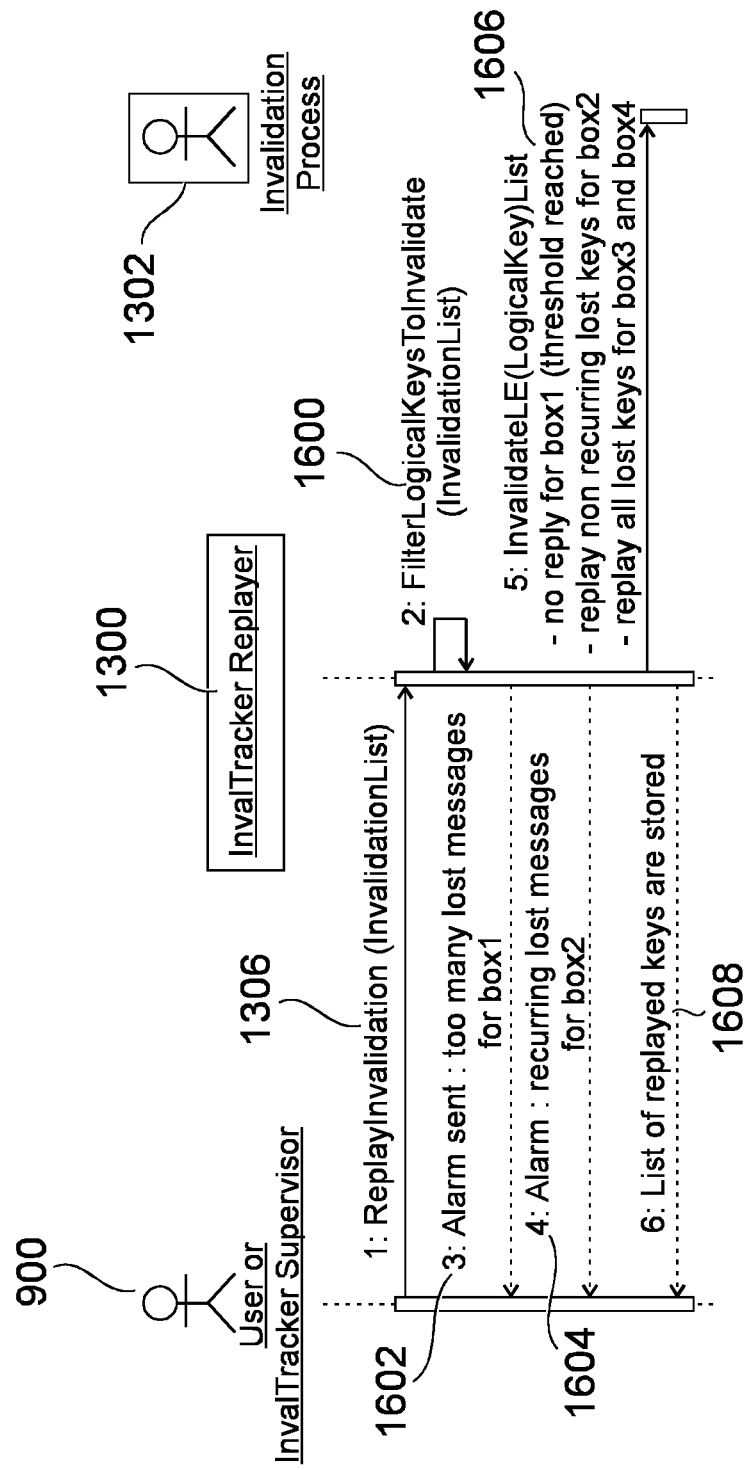

FIG. 16 discloses a use case in which there are lost invalidation messages on a number of targets. Message 1306 is sent as described above and a filter is applied at step 1600. The filter determines that there are too many lost messages for box 1 (target one) and an alarm message is generated at step 1602. In addition, the filter identifies box 2 (target two) has a number of recurring lost messages at step 1604. The invalidation tracker replay module then generates the list of messages to be replayed through the invalidation process 1302 at step 1606. Step 1606 includes no messages for replaying messages to box 1; messages for box 2 are only those which relate to non-recurring lost keys; and for all other boxes (targets) all lost keys are replayed. In step 1608 the user is notified of the messages that have been replayed so they may be stored.

Figure 17:
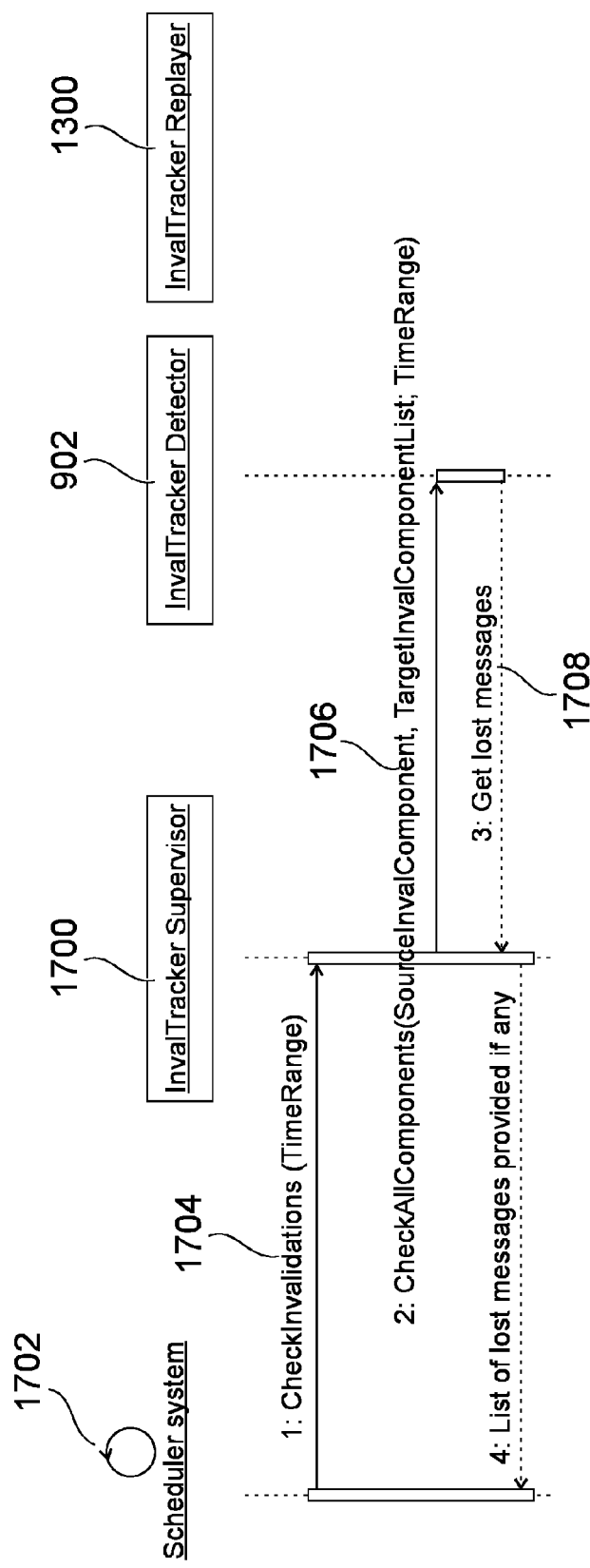

FIG. 17 relates to the use case involving the invalidation tracker supervisor 1700. The process is coordinated by the schedule system 1702 to regularly run the process. The system also makes use of the invalidation tracker detector 902 and the invalidation tracker replay module 1300. A time range and list of system components to be checked are generated and the invalidation tracker replay module is deactivated. A list of lost invalidation messages is generated as a result of the process, if there are any lost messages. This use case describes the process that supervises the invalidation message flow and is fully automatic. Reports containing lost invalidation messages may be produced. In a first step 1704 the scheduler of the system generates a check invalidation messages request for a specific time range. At step 1706 the invalidation tracker supervisor requests the invalidation tracker detector to globally check the invalidation flow over a given time span. The invalidation tracker detector identifies any keys or lost messages and returns these in a list in step 1708.

Figure 18:
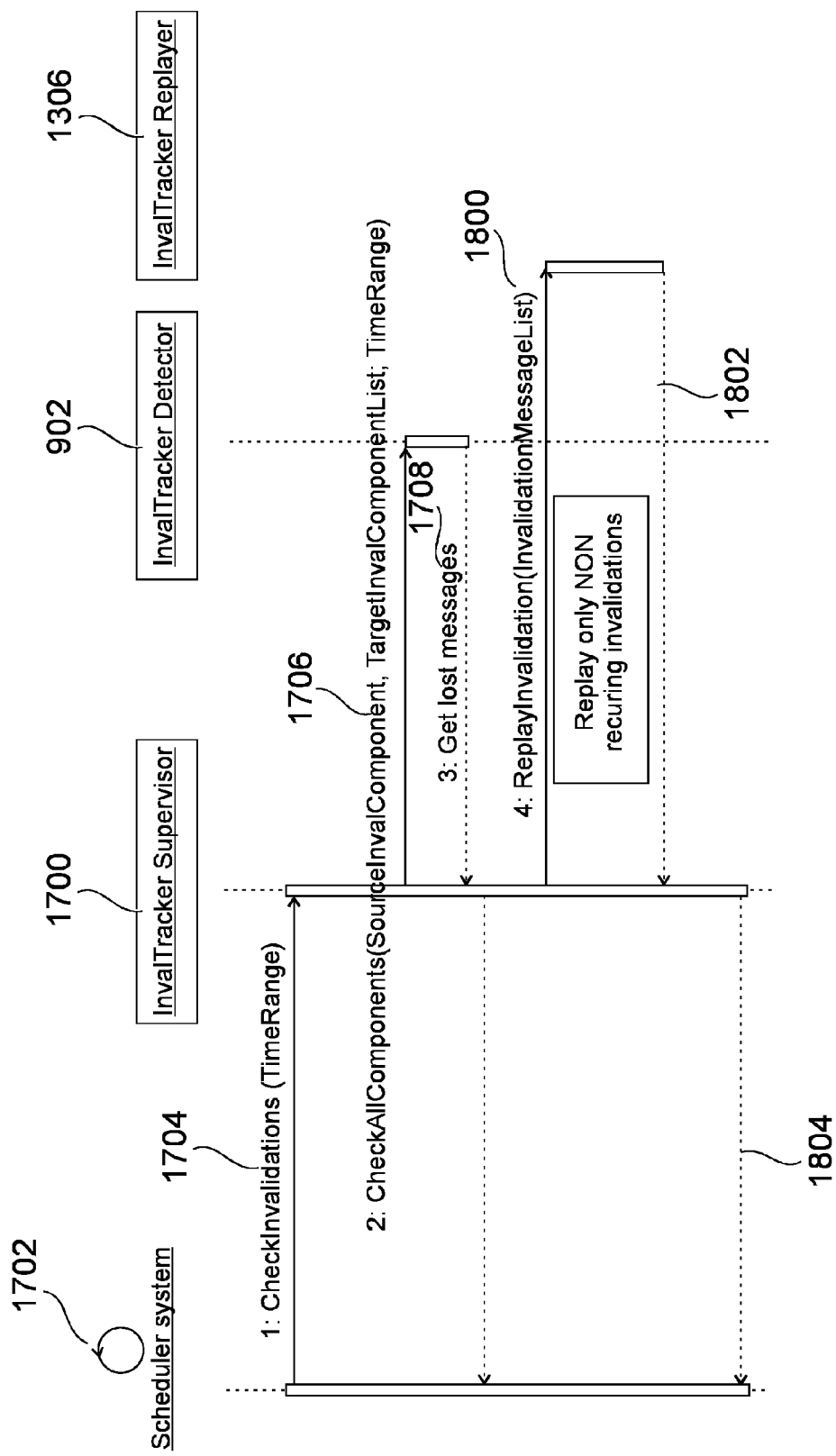

FIG. 18 shows the use case where an invalidation tracker supervisor generates an automatic replay. Steps 1704, 1706 and 1708 proceed as previously described. This use case describes the process that supervises the invalidation message flow; is scheduled by the schedule system; and is fully automatic. Reports are produced and alarms can be generated by the invalidation tracker replay module to be sent to the user in case of a recurring error. The supervising process uses functionalities already described in the invalidation tracker detector and invalidation tracker replay module use cases. In step 1804 a list of replay invalidation messages is sent from the invalidation tracker supervisor to the invalidation tracker replay module. Only non-occurring invalidation messages will be replayed. Confirmation that the messages have been replayed is sent in step 1802 to the invalidation tracker supervisor, and in step 1804 to the user.

A person skilled in the art will understand that some or all of the functional entities as well as the processes themselves may be embodied in software, or one or more software-enabled modules and/or devices or in any combination thereof. The software may operate on any appropriate computer or other machine. The operation of the invention provides a number of transformations such as monitoring invalidation messages and resending, as necessary.

The system and method operates on a specific machine such as a computer configured to carry out the various steps and functions of the invention. The invention also relates to a number of transformations, including the ability to monitor key logging data and using this to resend or replay messages.

In one exemplary implementation, the subject matter described herein can be implemented using a non-transitory computer readable medium having stored thereon a computer program comprising instructions for carrying out any of the methods described herein. For example, any of the components and processes described herein may be implemented in software embodied in a non-transitory computer readable medium and executed by a processor. Exemplary computer readable media suitable for implementing the subject matter described herein include disk memory devices, chip memory devices, programmable logic devices, and application specific integrated circuits. In addition, a computer readable medium that implements the subject matter described herein may be located on a single device or a computing platform or may be distributed across plural devices or computing platforms.

This invention has been described with reference to the use of invalidation messages in the travel environment. However, it will be appreciated that the invention may apply to other environments. It will be appreciated that this invention may be varied in many different ways and still remain within the intended scope of the invention as defined in the claims.

The invention claimed is:

1. An invalidation tracker system for tracking invalidation messages in a caching architecture, the invalidation tracker system comprising:
   a processor for tracking the invalidation messages in the caching architecture, wherein the caching architecture includes a plurality of levels and each of the plurality of levels comprises at least one server, and wherein invalidation messages are communicated from one of the plurality of levels to another one of the plurality of levels in order to send the invalidation messages to all of servers in the caching architecture, and wherein the servers each include a corresponding key logger for locally storing all the invalidation messages received by each server; and a computer storage medium including a plurality of instructions that, when executed by the processor, cause the invalidation tracker system to:

record all of the invalidation messages communicated to the servers in the caching architecture to form a set of sent invalidation messages, wherein the invalidation messages are for invalidating content within the caching architecture;

determine the invalidation messages received at each of the servers in the caching architecture and comparing the invalidation messages with the set of sent invalidation messages to identify one or more undelivered invalidation messages;

check the corresponding key logger for each of the servers one level at a time within the caching architecture to determine the invalidation messages received at each of the plurality of levels in the caching architecture;

identify a specific level within the caching architecture where the one or more undelivered invalidation messages were not delivered based on comparing the invalidation messages received at each of the plurality of levels in the caching architecture with the set of sent invalidation messages, wherein the invalidation tracker system determines the specific level within the caching architecture by checking the key logger for each of the servers one level at a time within the caching architecture; and resend the one or more undelivered invalidation messages to an appropriate server in the caching architecture.

2. The invalidation tracker system of claim 1, wherein the invalidation tracker system is caused to resend invalidation messages based on a predetermined condition having been met.

3. The invalidation tracker system of claim 2, wherein the predetermined condition comprises a plurality of recurring undelivered invalidation messages.

4. The invalidation tracker system of claim 2, wherein the predetermined condition is triggered if a number of undelivered invalidation matched messages exceeds a predetermined threshold.

5. The invalidation tracker system of claim 2, wherein the predetermined condition is identification of at least one of the servers being non-operational.

6. The invalidation tracker system of claim 1, wherein the invalidation tracker system is further caused to create and communicate notifications of the one or more undelivered invalidation messages to a user.

7. The invalidation tracker system of claim 1, wherein the invalidation tracker system is further caused to create reports containing lost invalidation messages and communicate the reports to a user.

8. The invalidation tracker system of claim 1, wherein the invalidation tracker system is further caused to control automatic retrieval of the one or more undelivered invalidation messages.

9. The invalidation tracker system of claim 1, wherein the invalidation tracker system is further caused to store information relating to the settings and topography of the caching architecture.

10. A method for tracking invalidation messages in a caching architecture of a pricing and shopping platform, the method comprising:

providing a plurality of levels within the caching architecture, wherein each of the plurality of levels comprises at least one server and the invalidation messages are communicated from one of the plurality of levels to another one of the plurality of levels in order to send the invalidation messages to all of the servers in the caching architecture;

providing a corresponding key logger for each of the servers in the caching architecture, wherein the corresponding key logger locally stores all the invalidation messages received by each server;

recording, by a processor, all of the invalidation messages communicated to the servers in the caching architecture to form a set of sent invalidation messages, wherein the invalidation messages are for invalidating content within the caching architecture;

determining, by the processor, the invalidation messages received at each server in the caching architecture and comparing the invalidation messages with the set of sent invalidation messages to identify one or more undelivered invalidation messages;

checking the corresponding key logger for each of the servers one level at a time within the caching architecture to determine the invalidation messages received at each of the plurality of levels in the caching architecture;

identifying, by the processor, a specific level within the caching architecture where the one or more undelivered invalidation messages were not delivered based on comparing the invalidation messages received at each level in the caching architecture with the set of sent invalidation messages, wherein the processor determines the specific level within the caching architecture by checking the key logger for each of the servers one level at a time within the caching architecture; and resending the one or more undelivered invalidation messages to an appropriate server in the caching architecture by the processor.

11. The method of claim 10, wherein replaying an invalidation message is based on a predetermined condition.

12. The method of claim 11, wherein the predetermined condition comprises identifying a plurality of recurring undelivered invalidation messages.

13. The method of claim 11, wherein the predetermined condition comprises triggering a replay of messages if a number of undelivered invalidation matched messages exceeds a predetermined threshold.

14. The method of claim 11, wherein the predetermined condition comprises identifying if at least one of the servers is non-operational.

15. The method of claim 10, further comprising creating and communicating notifications of the one or more undelivered invalidation messages to a user.

16. The method of claim 10, further comprising creating reports containing lost invalidation messages and communicating the reports to a user.

17. The method of claim 10, further comprising controlling automatic retrieval of the one or more undelivered invalidation messages.

18. The method of claim 10, further comprising storing information relating to a setting and topography of the caching architecture.

19. A computer program comprising:

a non-transitory computer readable storage medium including instructions for tracking invalidation messages in a caching architecture of a pricing and shopping platform, wherein the computer program when executed by a computer, causes the computer to:

record all of the invalidation messages communicated to a plurality of servers in a caching architecture to form a set of sent invalidation messages, wherein the caching architecture includes a plurality of levels and each of the plurality of levels comprises at least one server, and wherein the invalidation messages are communicated from one of the plurality of levels to another one of the plurality of levels in order to send the invalidation messages to all of the plurality of servers in the caching architecture, and wherein the plurality of servers each include a corresponding key logger for locally storing all the invalidation messages received by each server;

determine the invalidation messages received at each of the servers in the caching architecture and comparing the invalidation messages with the set of sent invalidation messages to identify one or more undelivered invalidation messages;

check the corresponding key logger for each of the servers one level at a time within the caching architecture to determine the invalidation messages received at each of the plurality of levels in the caching architecture;

identify a specific level within the caching architecture where the one or more undelivered invalidation messages were not delivered based on comparing the invalidation messages received at each of the plurality of levels in the caching architecture with the set of sent invalidation messages, wherein the computer determines the specific level within the caching architecture by checking the key logger for each of the servers one level at a time within the caching architecture; and resend the one or more undelivered invalidation messages to an appropriate server in the caching architecture.

* * * * *